V. Z. CARACRISTI.
COMBINED STRAINER AND COUPLING FOR PNEUMATIC HOSE.
APPLICATION FILED JULY 6, 1910.
993,152.
Patented May 23, 1911.
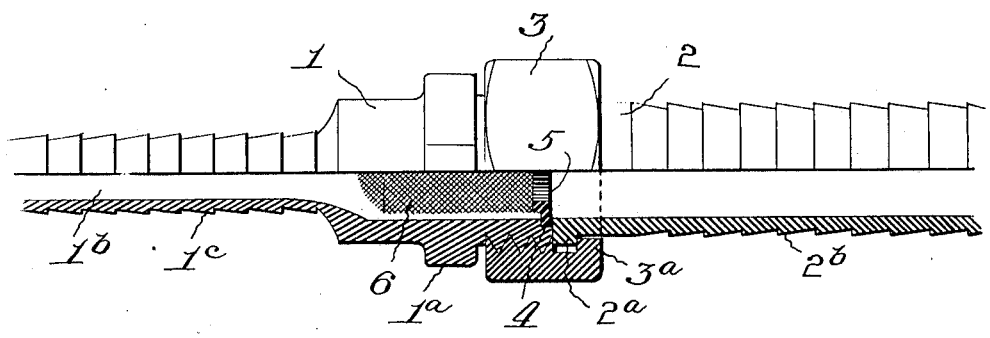
Witnesses:
W. T. S. Duvall
W. S. Beall
Inventor:
V. Z. Caracristi,
by W. T. Duvall, Attorney.

UNITED STATES PATENT OFFICE.

VIRGINIUS Z. CARACRISTI, OF RICHMOND, VIRGINIA.

COMBINED STRAINER AND COUPLING FOR PNEUMATIC HOSE.

993,152.  Specification of Letters Patent.  Patented May 23, 1911.

Application filed July 6, 1910. Serial No. 570,594.

*To all whom it may concern:*

Be it known that I, VIRGINIUS Z. CARACRISTI, a citizen of the United States, residing at Richmond, in the county of Henrico and State of Virginia, have invented a Combined Strainer and Coupling for Pneumatic Hose, of which the following is a full and complete specification.

This invention is an improvement in hose-lines employed for the purpose of conducting compressed air, or other fluid pressure, to mechanically-operated tools, for conducting gas to burners, and for like purposes, and relates more especially to the complete coupling device for detachably connecting the parts of the hose-line.

The primary object of my invention is to provide a particular form of coupling in connection with a particular form of strainer adapted to be held in place by the coöperating parts of said coupling, the strainer being so disposed in the hose-line as to catch and retain dirt and other particles and thereby prevent the same from getting into the operative parts of a tool or burner.

With this primary object in view my invention consists in the particular construction and combination of parts constituting the coupling and strainer for pneumatic hose-line, etc., all as hereinafter fully described and specifically set forth in the appended claim.

In the accompanying drawing, which forms a part of this specification, I have shown in side elevation, and partly in section, a hose-line coupling device and strainer, constructed in accordance with my invention.

In carrying out my invention the hose-coupling is preferably made in three parts; to wit, the coupling-head 1, the coöperating sleeve 2, and the clamping-nut 3; the latter being threaded on one end of the coupling-head and having an inwardly-projecting annular flange 3$^a$ which engages a circumferential flange 2$^a$ on the sleeve, so as to clamp the coupling-head and sleeve tightly together when the nut is screwed upon the coupling-head. For the purpose of holding the coupling-head while the clamping-nut is being turned said coupling-head may be, and preferably is, provided with a circumferential projection 1$^a$ of conventional shape to receive a wrench.

The sleeve 2 is provided externally with the usual ribs 2$^b$ for the air-tight connection of the hose thereto, and the integral sleeve 1$^b$ of the coupling-head is also provided with similar ribs, as 1$^c$, for the air-tight connection of the hose which leads to the tool.

The bore of the main portion of the coupling-head is greater than the bore of the sleeve-portion 1$^b$, the larger bore being of the same diameter as the bore of the coupling-sleeve 2. Said larger bore is reamed at its outer end to form an annular recess 4, which provides a seat for an angular washer or ring 5, forming a part of a strainer 6 to support the latter in the coupling.

In the present instance I provide a bag-like strainer, preferably of wire-gauze material, as shown in the drawing, and after fitting the open end thereof over the projecting portion at the inner edge of the ring solder the parts together, though it will be understood, of course, that I may in some instances secure the strainer to the ring by wire, or in any other suitable manner. The outer rim of the ring or washer is of such thickness with respect to the depth of the recess 4 that said ring not only forms a means of attachment of the strainer within the coupling, but also serves the capacity of a washer between the parts 1 and 2 of the hose-coupling, so as to provide an air-tight joint. Therefore I purpose making the supporting-ring or washer 5 of such metal or material that will best serve the double purpose.

In applying the strainer it is placed within the coupling-head so as to project rearwardly therein or toward the sleeve connecting the hose which leads to the tool, so that the bag-like strainer will catch and hold the dirt or other foreign particles which may pass into the hose-line and facilitate the operation of removing the same; this latter operation being effected by simply turning the clamping-nut 3 to disconnect and separate the parts 1 and 2, after which the strainer may be readily removed from the coupling-head or part 1 and cleaned.

It will be noted that the bag-like strainer is of such size with respect to the bore in which it is located as to leave a space between the sides of said strainer and the bore, whereby should the closed end of the strainer become filled with dirt or other foreign material it would not obstruct the free passage of the air to the tool, in that the air could pass through the sides of the strainer. It will be noted, also, that the supporting ring or washer of the strainer being firmly and securely clamped between the parts 1 and 2 of the hose-coupling will properly support the strainer so that the sides thereof will not touch the sides of the bore, permitting a free passage of air through all parts of the strainer.

The device though primarily intended for that class of hose-lines employed for conducting fluid-pressure to different kinds of tools, may be used also in connection with hose-lines employed for other purposes, as for conducting gas to burners.

Having thus described my invention, what I claim as new, and desire to secure by Letters-Patent, is:—

In a hose-line for the purposes set forth, the combination, of a coupling comprising a coupling-head having a differential bore forming an enlarged chamber, a coupling-sleeve having a circumferential shoulder, and a clamping-nut threaded on the coupling-head and having an inwardly-projecting annular flange engaging the aforesaid shoulder to clamp the coupling-head and coupling-sleeve together, the outer end of the larger portion of the bore of the coupling-head being reamed to provide a shallow seat; together with a bag-like strainer located within the enlarged chamber, and an angular washer to which the open-end of the bag-like strainer is attached, the rim of said washer being clamped in the seat between the coupling-head and coupling-sleeve of the hose-coupling to support the strainer within the coupling and form an air-tight joint for said coupling, substantially as herein shown and described.

In testimony whereof, I have signed my name to this specification in the presence of two subscribing witnesses.

VIRGINIUS Z. CARACRISTI.

Witnesses:
    J. G. SCHAFER,
    W. R. JOHNSTON.